No. 677,924. Patented July 9, 1901.
R. BATESON.
WEFT FORK.
(Application filed Mar. 22, 1901.)

(No Model.)

Witnesses
Norris A. Clark.
M. H. Hatkins

Inventor
Robert Bateson
By Geo. H. Whitney
Attorney

THE NORRIS PETERS CO., PHOTO-LITHO., WASHINGTON, D. C.

UNITED STATES PATENT OFFICE.

ROBERT BATESON, OF FALL RIVER, MASSACHUSETTS.

WEFT-FORK.

SPECIFICATION forming part of Letters Patent No. 677,924, dated July 9, 1901.

Application filed March 22, 1901. Serial No. 52,320. (No model.)

*To all whom it may concern:*

Be it known that I, ROBERT BATESON, a citizen of the United States, residing at Fall River, in the county of Bristol and State of Massachusetts, have invented certain new and useful Improvements in Weft-Forks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to weft-forks for looms; and its objects are to prevent the entanglement of the weft with the tines of the fork, relieve the fork-bearings of strain, increase the lift of the hook, lessen the friction on the weft, and keep a clean selvage on the goods. I accomplish all this by making the hook of the fork separate from the tines, pivoting these two parts separately, and extending the ends of the tines backwardly to engage with and lift the hook.

Figure 1:
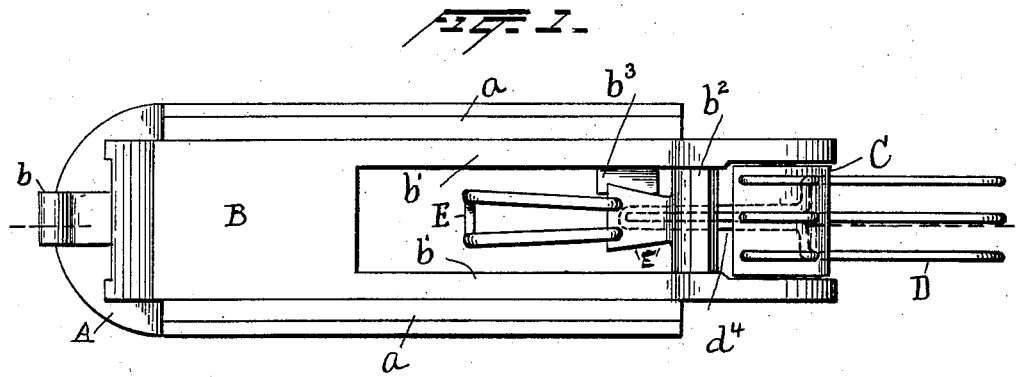
Figure 2:
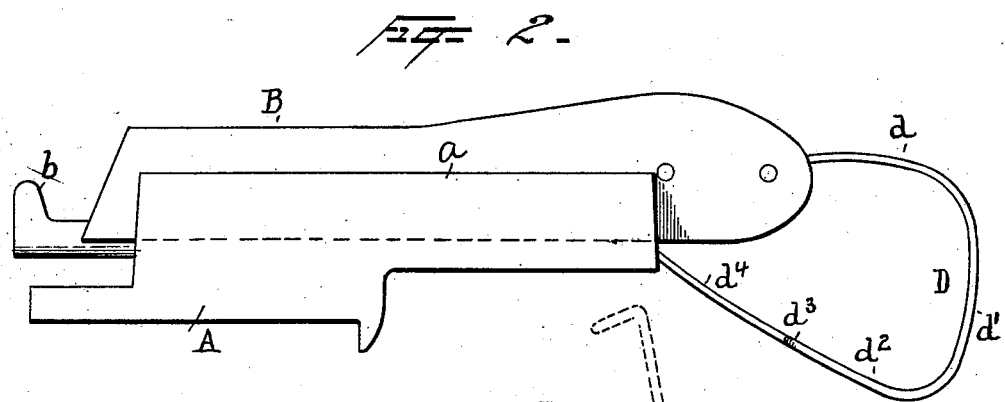
Figure 3:
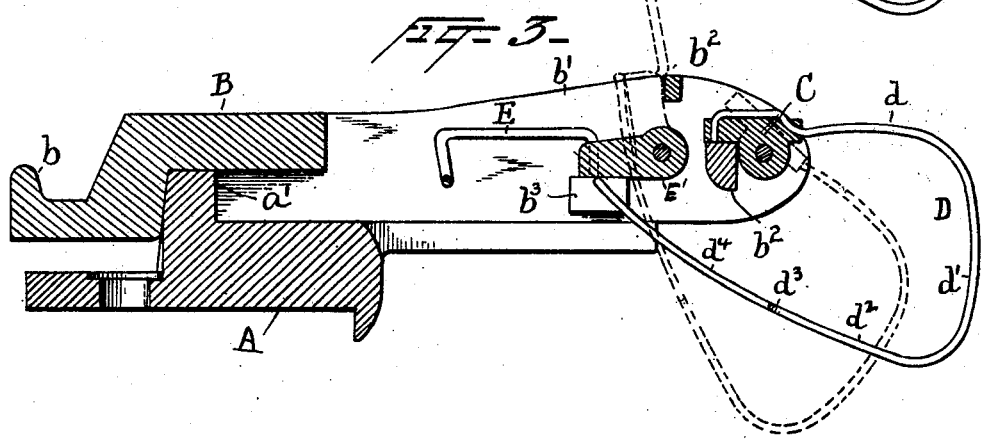

In the accompanying drawings, Figure 1 is a top plan view of my improved weft-fork. Fig. 2 is a side elevation. Fig. 3 is a longitudinal vertical section.

The stand A is suitably secured to a stationary portion of the loom-frame. It has side flanges $a$ and an upright stop-lug $a'$. Between the flanges fits the slide B, hollowed out beneath to fit over the stop-lug and having at its rear end a finger $b$ to actuate the stop-motion mechanism. The forward portion of the slide is composed of two side plates $b'$, connected by cross-bars $b^2$. Pivoted between the front ends of the side plates $b'$ is a block C, adapted to be retained in a normal position by abutting upon a suitable stop, such as one of the cross-bars. The tines D, preferably three in number, are attached to the block C and extend forward at $d$, then downward at $d'$, and then backward at $d^2$, their ends being brought together at $d^3$ and united into a tail $d^4$. Just above the end of this tail the hook E is pivoted between the side plates, resting normally on a lug $b^3$, projecting from one of said plates.

The hook E is preferably made of a piece of wire doubled upon itself, the bight of the loop being turned down to form the hook and the free ends being also turned down to enter sockets in a block E', suitably pivoted between the side plates. This block lies directly above and is substantially in contact with the end of the tail $d^4$, so that when the front portion $d'$ of the tines strikes the weft-thread the tines are forced backward, the end of the tail $d^4$ tilting up the hook E, as shown in Fig. 3. The upper cross-bar serves as a stop for the hook. It will be seen that a comparatively slight movement of the tines will lift the hook out of the path of the vibrating lever of the stop-motion, thus lessening the friction on the weft. The backward curve of the tines affords a complete safeguard against their entanglement in the weft, and thus preserves a clean selvage on the goods. The separate pivoting of the hook relieves the fork-bearings of all strain when the stop-motion operates, and thus insures a more prompt and delicate action.

Having thus described my invention, what I claim, and desire to secure by Letters Patent, is—

1. A weft-fork having its hook pivoted separately from its tines, said tines being extended backward to engage with said hook.

2. In a weft-fork, the combination with a pivoted hook, of separately-pivoted tines extended backward to a point beneath and in close proximity to said hook whereby a slight movement of said tines will lift said hook.

3. In a weft-fork, the combination with a pivoted hook, of separately-pivoted tines extended backward and united into a tail arranged to lift said hook.

4. In a weft-fork, two or more parallel tines extending forward, downward and backward, and united into a tail in combination with a pivoted block carrying a hook and located just above the end of said tail so as to be lifted thereby.

5. The combination with the stand having flanges, of the slide fitting between said flanges and having a finger and side plates, a hook and tines separately pivoted between said plates, cross-bars serving as stops for the hook and tines, and a lug to support the hook.

In testimony whereof I affix my signature in presence of two witnesses.

ROBERT BATESON.

Witnesses:
ARBA N. LINCOLN,
ALFRED H. HOOD.